3,003,976
CONDUCTING VISCOUS FLUID
Joseph S. Lord, Walpole, Mass., assignor to Instrument Development Laboratories, Inc., a corporation of Massachusetts
No Drawing. Filed Jan. 31, 1956, Ser. No. 562,605
5 Claims. (Cl. 252—518)

The present invention relates to viscous fluids used in measuring instruments which utilize viscosity and conductivity for the purpose of integration and indicating values of measurements of velocity, displacement and other similar measurements.

In the present invention, the viscous fluid may be applied to any family of instruments where a conductive or non-conductive body is to be moved through the viscous fluid and the displacement of the body therein is used to indicate a desired measurement.

In this respect the invention may be used for an integrating accelerometer employing a buoyant body movable along a spinning axis.

The invention is also applicable to other instruments which utilize liquid supports with or without simultaneous electrolytic pick-off, although the invention is particularly used in connection with instruments in which displacement may be measured by a resistive change due to a change in the position of an element of the instrument. Reference may be had in this respect to the United States patent application Serial No. 348,171, filed April 13, 1953, for an Integrating Accelerometer.

In this application a buoyant cylinder is immersed in a viscous fluid and is maintained at the center of the housing or container in which the buoyant element is positioned by spinning the container about its longitudinal axis at a high velocity. In this way coaxial alignment is maintained between the buoyant element and the container. Sufficient centripetal force is generated to exceed greatly any radial force encountered, including that of gravity so that the buoyant element is rendered almost completely insensitive to radial components of applied force.

Due to the integration of applied force by the viscous fluid, the coaxial velocity of the buoyant element relative to the container in such an instrument will be proportional to the axial component of acceleration applied to the container, while the net change in element displacement will be proportional to the net change in container axial velocity. By making the fluid conductive, element displacement can be measured in electrical terms, the assembly of elements, fluid and input and output electrodes forming in effect a liquid potentiometer.

It is in this type of instrument that the choice of the proper viscous fluids to be used is of great importance as measurements are to be made over a comparatively long period of time and to a great accuracy.

Other types of instruments in which a body is spun on an axis in a liquid medium where the viscosity must be kept constant may use a fluid according to the present invention, particularly where the fluid must be conductive.

An ideal fluid for use in the above instrument and other similar instruments is required to exhibit the following characteristics.

(1) It must be chemically inert with respect to the materials in contact with it at all temperatures within the operating range of the instrument.

(2) It must be capable of continuous, controlled viscosity variations over a wide range while remaining within all other specifications.

(3) It must have sufficient high density for adequate element buoyancy at all viscosities.

(4) It must be Newtonian over the applicable range of shear rates, i.e. shear stress must be proportional to rate of shear to satisfy this condition.

(5) It must be a compatible and stable conducting solution such that the desired resistivity can be achieved without corrosion, reduction or gas generation.

It may be noted, however, that in cases for the operation of an instrument in the range of a given viscosity and at a particular temperature, these conditions above set forth are more readily realized at controlled ambient conditions.

It is desirable in many cases that the operation of the instrument be controlled at a given desired temperature as for instance, a temperature of 140° F. or 167° F., but any other chosen or established temperature may be used in which case, the fluids chosen must fulfill the conditions set forth above.

With regard to characteristic 3, it has been found that the viscous fluid should have a density between 1.15 and 1.35 for best general operating conditions, particularly in connection with the accelerometer previously mentioned and other similar instruments. However, densities lesser or greater than the above limit can be utilized at some increase in manufacturing difficulties.

For closest realization of the characteristics mentioned above, the viscous fluid may comprise an aqueous solution of polyhydric alcohols and their derivatives with suitable dissolved conductive salts.

It has been found that copper salts may be successfully used for this purpose, but other types of salts which provide proper resistivity in a stable non-corrosive solution may be used. The polyhydric alcohols and copper salts are stable in particular in contact with copper, platinum, glass, and suitably treated lead tin solders.

As an example of a stable viscous fluid, the applicant has used the following mixture:

Arlex, a proprietary aqueous polyhydric alcohol solution containing sorbitol and anhydrides of sorbitol, together with other polyhydric derivatives of sorbitol.
100 cc. (83% commercial solution).
Water 1.35 cc.
Cupric ammonium chloride 0.11 gram.

The solution described above has the following characteristics:

The viscosity at 140° F. is equal to 94 centipoises. The specific gravity at this temperature is 1.296. The resistivity is 15,000 ohms cm. This solution complies with the general conditions which have been previously above set forth.

It is highly Newtonian in character allowing a precise linear calibration of the instrument. It has a pH of approximately 4, and it shows no tendency to reduce or crystallize at or below the operating temperatures including storage temperatures down to −70° F. Lack of crystallization prevents local changes in volume which might damage internal parts of the instrument.

Arlex in itself as commercially available, has a viscosity of approximately 1,700 centipoises at 77° F., or 50 centipoises at 167° F., which is the standard operating temperature for accelerometers of the type described in the application mentioned above. The viscosity of this fluid can be reduced by thinning with water from 1,700 centipoises to approximately 32 centipoises at 167° F., without serious degradation of density advantage. The specific resistivity can also be adjusted by varying the concentration of the dissolved conductive salt.

For higher velocity ranges, the viscosity of Arlex can be greatly increased to at least 1,200 centipoises at 167° F., by evaporation and the desired viscosity achieved to good precision by thinning thereafter with water.

For lower velocity ranges, the following type of solution may be used:

A trihydric alcohol such as glycerin 100 cc. of 98% cp. glycerin.

Water 6.3 cc.

Cupric ammonium chloride 0.11 gram.

This solution has the following characteristics:

Viscosity (at 167° F.) 14.7 centipoises.

Specific gravity (at 167° F.) 1.208.

Resistivity 14,000 ohms cc. (at 167° F.).

The velocity may be further decreased by replacing some of the glycerin with water, increased by reduction of water content to about 30 centipoises. Other pertinent characteristics of the solution described in connection with the first example are similar to those attributed to the solution of this example.

It is understood that fluids of the family herein mentioned may be used in other types of instruments for viscous shear integration, liquid support, electrolytic pick-off, or any combination of these effects.

Example of such instruments include rate and integrating gyroscopes and straight accelerometers.

In addition to the features mentioned above, these suggested applications for use of the present viscous fluid are based on the high transducer efficiency of the conducting viscous liquids and on their shock and vibration isolation characteristics. A particular advantage of conducting fluid pick-offs is that forces of practical importance are produced on the sensitive instrument elements due to the signal pick-off system.

It is also understood that considerable variation in the constitution of such fluids is possible within the spirit of this invention, including not only variations in the proportions of the ingredients mentioned in the example, but also in the use of other polyhydric alcohols such as mannitol, dulcitol or sorbitol and mixtures of the classes mentioned. For examples of fluids given within it is emphasized that the characteristics listed such as viscosity resistivity and density are functions of the temperature and obey well defined laws with variance of same. Furthermore, the use of salts of near-noble metals, i.e., salts of active metals, other than copper are conceivable within the scope of this invention.

The invention described herein is limited to use with alternating current circuits and stability of the fluids in unidirectional current circuits is not claimed.

Having now described my invention, I claim:

1. A stable conductive viscous liquid solution consisting essentially of elements mixed in substantially the following proportions, 100 cc. of an aqueous polyhydric alcohol containing anhydrides and polyhydric derivatives of sorbitol, 1.35 cc. of water, and .11 gram of cupric ammonium chloride.

2. The fluid defined by claim 1 wherein the mixture at 140° F. has a specific gravity of substantially 1.296 and a viscosity of substantially 94 centipoises.

3. The fluid defined by claim 1 wherein the viscosity of the said polyhydric alcohol at 167° F. is between 50 and 1200 centipoises.

4. A stable conductive viscous liquid solution consisting of elements mixed in substantially the following proportions: 100 cc. of glycerin, 6.3 cc. of water, and .11 gram of cupric ammonium chloride.

5. The fluid defined by claim 4 wherein the mixture at 167° F. has a viscosity of substantially 15 centipoises when the specific gravity is equal to substantially 1.2.

References Cited in the file of this patent

UNITED STATES PATENTS

| | | |
|---|---|---|
| 2,255,515 | Popper | Sept. 9, 1941 |
| 2,372,829 | Holst | Apr. 3, 1945 |
| 2,466,445 | Landav | Apr. 5, 1949 |

OTHER REFERENCES

Smith's College Chemistry, sixth ed. by William F. Ehret, D. Appleton-Century Co. Inc. (1946), pp. 510–512 and 540, 541.